(12) United States Patent
Sugiyama (10) Patent No.: US 8,511,873 B2
(45) Date of Patent: Aug. 20, 2013

(54) OPTICAL UNIT

(75) Inventor: Yuji Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 268 days.

(21) Appl. No.: 13/114,194

(22) Filed: May 24, 2011

(65) Prior Publication Data

US 2011/0305033 A1    Dec. 15, 2011

(30) Foreign Application Priority Data

Jun. 9, 2010  (JP) ................................. 2010-131712

(51) Int. Cl.
*B60Q 1/00* (2006.01)
(52) U.S. Cl.
USPC ........................... 362/539; 362/512; 362/523
(58) Field of Classification Search
USPC .................................. 362/512, 523, 539, 538
See application file for complete search history.

(56) References Cited

U.S. PATENT DOCUMENTS

| | | | | |
|---|---|---|---|---|
| 6,280,070 | B1* | 8/2001 | Ishida et al. | 362/523 |
| 8,104,938 | B2* | 1/2012 | Takada | 362/509 |
| 2004/0001343 | A1* | 1/2004 | Albou | 362/520 |
| 2006/0291230 | A1* | 12/2006 | Tajima et al. | 362/512 |
| 2009/0213610 | A1* | 8/2009 | Yamamoto | 362/539 |

FOREIGN PATENT DOCUMENTS

JP    2007-179969 A    7/2007

* cited by examiner

*Primary Examiner* — Evan Dzierzynski
(74) *Attorney, Agent, or Firm* — Sughrue Mion, PLLC (57) ABSTRACT

An optical unit used in a vehicle lighting device, includes a plurality of first shades which are disposed adjacent to each other in a vehicle width direction and are separated by a specific gap, wherein at least one of the first shades is movable between an advanced position which blocks a part of light emitted from a light source and a retreated position which does not block the light, a second shade, which is engaged with an end portion in the vehicle width direction of the at least one of the first shades, and driven by the first shade to move between the advanced position and the retreated position, and covers the gap between the adjacent first shades, and a movement mechanism which is connected to the at least one first shade and moves the first shade to one of the advanced position and the retreated position.

6 Claims, 8 Drawing Sheets

| CONTROL PATTERN | LIGHT DISTRIBUTION PATTERN |
|---|---|
| CONTROL 1<br>· BULBS 14a, 14b    ON<br>· FIRST SHADE      OFF<br>· SECOND SHADE     OFF |  |
| CONTROL 2<br>· BULBS 14a, 14b    ON<br>· FIRST SHADE      ON<br>· SECOND SHADE     ON |  |
| CONTROL 3<br>· BULBS 14a, 14b    ON<br>· FIRST SHADE      OFF<br>· SECOND SHADE     ON |  |
| CONTROL 4<br>· BULBS 14a, 14b    ON<br>· FIRST SHADE      ON<br>· SECOND SHADE     OFF |  |

OPTICAL UNIT

CROSS REFERENCE TO RELATED APPLICATION(S)

This application is based upon and claims the benefit of priority from Japanese Patent Application No. 2010-131712 filed on Jun. 9, 2010, the entire contents of which are incorporated herein by reference.

TECHNICAL FIELD

The present disclosure relates to an optical unit, and particularly relates to a structure of an optical unit for a vehicle headlamp.

RELATED ART

Conventionally, there is known a variable light distribution vehicle headlamp apparatus in which a low-beam light distribution pattern is formed by blocking light from a light source using a shade, and a high-beam light distribution pattern is formed when the light is not blocked by the shade. In addition, with an increase in performance of vehicles in recent years, there is proposed a headlamp apparatus which forms a light distribution pattern having a shape different from standard low beam or high beam in accordance with the surrounding situation. In particular, in the case of the high beam, it is necessary to consider glare to an oncoming vehicle and a pedestrian as well as improving the view range of a driver. Accordingly, for example, a vehicle lighting device disclosed in Patent Document 1 has a structure in which an illuminated area of the high beam can be optimally set in accordance with the presence or absence of a pedestrian, a leading vehicle, or an oncoming vehicle.

[Prior Art Document]
[Patent Document]

[Patent Document 1] Japanese Unexamined Patent Publication No. 2007-179969

However, the vehicle lighting device of Patent Document 1 has a plurality of light sources, and the individual light sources illuminate different areas. Further, by combining turning on/off of the individual light sources, the illumination of, e.g., a part where a pedestrian is present is suppressed. Specifically, three light sources are mounted and three different illuminated areas can be formed. By controlling the three light sources, a turned-on state of all light sources, a turned-on state of two light sources, a turned-on state of one light source, and a turned-off state of all light sources are created to form various light distribution patterns. Thus, in the case of the vehicle lighting device of Patent Document 1, each of the areas to be or not to be illuminated requires the light source, which has led to an increase in the size of a casing, an increase in the cost of parts, and complication of control. In addition, with an increase in the number of light sources, required power has been increased. As a result, the development of an optical unit having a simple structure in which these points are improved is in demand.

SUMMARY

Exemplary embodiments of the present invention may provide an optical unit having a simple structure capable of forming light distribution patterns of which the number is not less than the number of types of light distribution patterns which can be realized only by turning on/off of a light source.

An optical unit used in a vehicle lighting device according to an embodiment, comprises:

a plurality of first shades which are disposed adjacent to each other in a vehicle width direction and separated by a specific gap, wherein at least one of plurality of first shades is movable between an advanced position which blocks a part of light emitted from a light source and a retreated position which does not block the light;

a second shade which is engaged with at least one end portion in the vehicle width direction of the at least one of the plurality of the first shades, and driven by the at least one of the plurality of first shades to move between the advanced position and the retreated position, and covers the gap between the adjacent first shades; and a movement mechanism which is connected to the at least one of the plurality of the first shades and moves the first shade to one of the advanced position and the retreated position.

According to the aspect described above, when the first shade is moved to the advanced position, different light distribution patterns can be formed by light blocking/non-light blocking by the first shade without changing the turned-on state of the light source. Since the plurality of first shades are disposed adjacent to each other, it is possible to further increase the number of types of the light distribution patterns by selecting the combination of the advanced position and the retreated position. In addition, the second shade covering the gap between the adjacent first shades is present. Since the second shade is driven by the first shade, even when the adjacent first shade move to the advanced position together, i.e., a light-blocking position, light leakage from between the adjacent first shades is prevented so that the quality of the light distribution pattern can be improved. Further, since the second shade is structured to be driven by the first shade, a drive mechanism is not additionally required so that the structure of the optical unit can be simplified. Furthermore, since the gap between the adjacent first shades is covered with the second shade, even when the adjacent first shades are disposed apart from each other, the light leakage can be prevented, and the the smooth movement of the individual first shades can be realized without causing an abrasion resulting from the contact therebetween.

A number of the second shades to be formed may be larger by one than a number of the first shades to be formed by one, and both of the end portions in the vehicle width direction of the at least one of the plurality of first shades may be engaged by one of the second shades.

By the movement of the first shade, the second shades engaged at both ends of the first shade are driven. In this case, even when a plurality of the first shades are successively disposed adjacent to each other, the second shades each having the function of preventing the light leakage can be reliably driven. Moreover, since the first and second shades can be structured as simple plate-like members, the simplification of the optical unit can be facilitated.

The at least one second shade may have an extended portion extending in an optical axis direction, the extended portion of the second shade being disposed between the adjacent first shades and may be formed with reflective surfaces to reflect the light from the light source to guide the reflected light forward of both surfaces thereof. Further, the extended portion of the second shade may be disposed at the end portion on a non-adjacent side of the first shade and may be formed with one of the reflective surfaces on an outside surface of the extended portion.

In this case, since the light reflected by the reflective surface formed on the extended portion is guided to a part in the light distribution pattern to be superimposed thereon, it is possible to perform an adjustment of an increase of the luminous intensity in the light distribution pattern. In addition, when the extended portion of the second shade is disposed at the end portion on the non-adjacent side of the first shade, a reduction in cost can be facilitated if the reflective surface is formed on the outside surface and the reflective surface on the inside surface is omitted.

The second shade may be disposed at the end portion on the non-adjacent side of the first shade and may be integrally formed with the first shade, and may have an L-shaped horizontal cross section.

According to this structure, it becomes possible to reduce the number of parts.

The movement mechanism may move the first shade to the retreated position when the movement mechanism is in a non-driven state.

For example, when the optical unit is for a high beam, a non-driven standard attitude of the first shade can be set as an attitude for a high beam turned-on state. It is to be noted that, in the case where the movement mechanism is brought into the non-driven state due to a failure or the like, a fail-safe function can be implemented since an illumination state can be shifted to a low-beam illumination state by turning off the light source. In other words, even when the movement mechanism fails, since the presence or absence of high-beam illumination can be controlled by turning on/off control of a bulb, it is possible to avoid the situation where a high-beam light distribution pattern can not be used.

The optical unit may comprises:

a first light source which emits light mainly to a driving lane side; and a second light source which emits light mainly to an opposite lane side.

According to this structure, since it is possible to control the turning on/off of the light sources on the driving lane side and on the opposing lane side independently of each other, it becomes possible to combine control of the first light source with control of the first and second shades, and to combine control of the second light source with control of the first and second shades, and therefore it becomes possible to further increase the number of types of the light distribution patterns.

According to the present invention, it is possible to provide an optical unit having a simple structure capable of forming light distribution patterns of which the number is not less than the number of types of light distribution patterns which can be realized only by turning on/off of a light source.

DETAILED DESCRIPTION

A description will be given hereinbelow of a mode for carrying out the invention (hereinbelow referred to as an embodiment) on the basis of the drawings.

Figure 1:
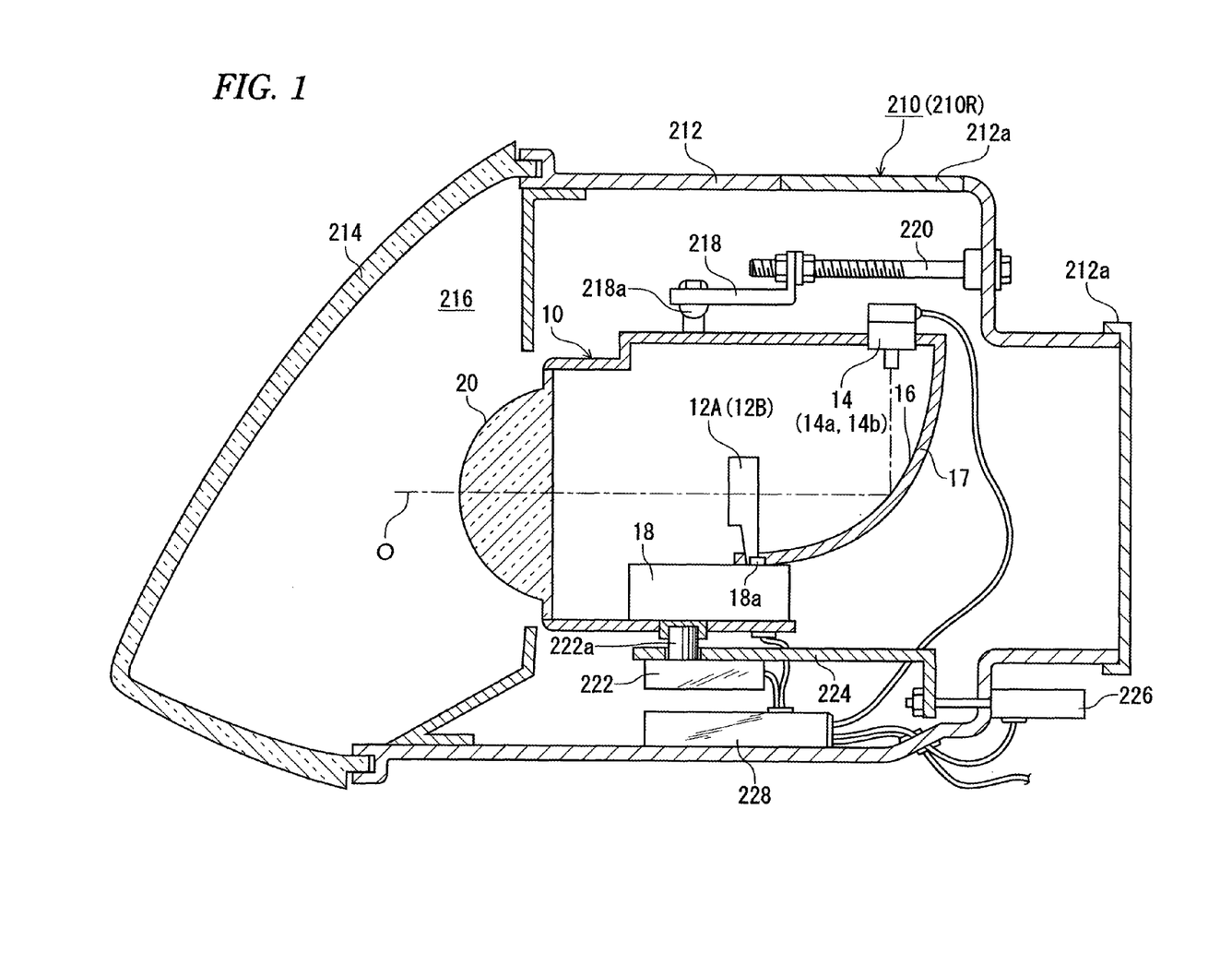
FIG. 1 is a schematic cross-sectional view explaining an internal structure of a vehicle headlamp apparatus having an optical unit according to the present embodiment mounted thereon.

FIG. 1 is a schematic cross-sectional view explaining an internal structure of a vehicle headlamp apparatus 210 having an optical unit 10 according to the present embodiment mounted thereon. The vehicle headlamp apparatus 210 includes high-beam headlamps disposed on left and right sides in a vehicle width direction of a vehicle, and the structures of the one disposed on the left side and the other one disposed on the right side are substantially equal to each other so that the structure of a vehicle headlamp apparatus 210R disposed on the right side of the vehicle will be described as the representative. It is to be noted that the vehicle headlamp apparatus for high beam 210 forms a high-beam light distribution pattern as a whole by superimposing a light distribution pattern on a low beam formed by a vehicle headlamp apparatus for low beam which is separately disposed.

The vehicle headlamp apparatus 210R includes a lamp body 212 and a transparent cover 214. The lamp body 212 has an opening portion in the forward direction of the vehicle, and has a detachable cover 212a on the rear side which is detached at the time of maintenance. In addition, the transparent cover 214 is connected to the opening portion at the front of the lamp body 212, and a lighting chamber 216 is thereby formed. In the lighting chamber 216, there is accommodated an optical unit 10 for emitting light in the forward direction of the vehicle. In a part of the optical unit 10, there is formed a lamp bracket 218 having a pivot mechanism 218a serving as a swing center of the optical unit 10. The lamp bracket 218 is screwed with an aiming adjustment screw 220, which is rotatably supported on a wall surface of the lamp body 212. Accordingly, the optical unit 10 is supported at a specific position in the lighting chamber 216 in a tilted attitude set by the adjustment state of the aiming adjustment screw 220.

In addition, to the lower surface of the optical unit 10, a rotation shaft 222a of a swivel actuator 222 is fixed, and the optical unit 10 is thereby rotatable in the horizontal direction. The swivel actuator 222 is fixed to a unit bracket 224. To the unit bracket 224, a leveling actuator 226 disposed outside the lamp body 212 is connected, and the optical unit 10 is thereby tiltable in the vertical direction.

On an inner wall surface of the lighting chamber 216, e.g., at a position below the optical unit 10, there is disposed a control section 228 which executes turning on/off control of the optical unit 10 and formation control of a light distribution pattern. The control section 228 may also execute control of the swivel actuator 222 and the leveling actuator 226. It is to be noted that the control section 228 may be provided outside the vehicle headlamp apparatus 210R. Further, the function thereof may be limited only to the function of relaying the control of the turning on/off or the like from the vehicle side.

Figure 2:
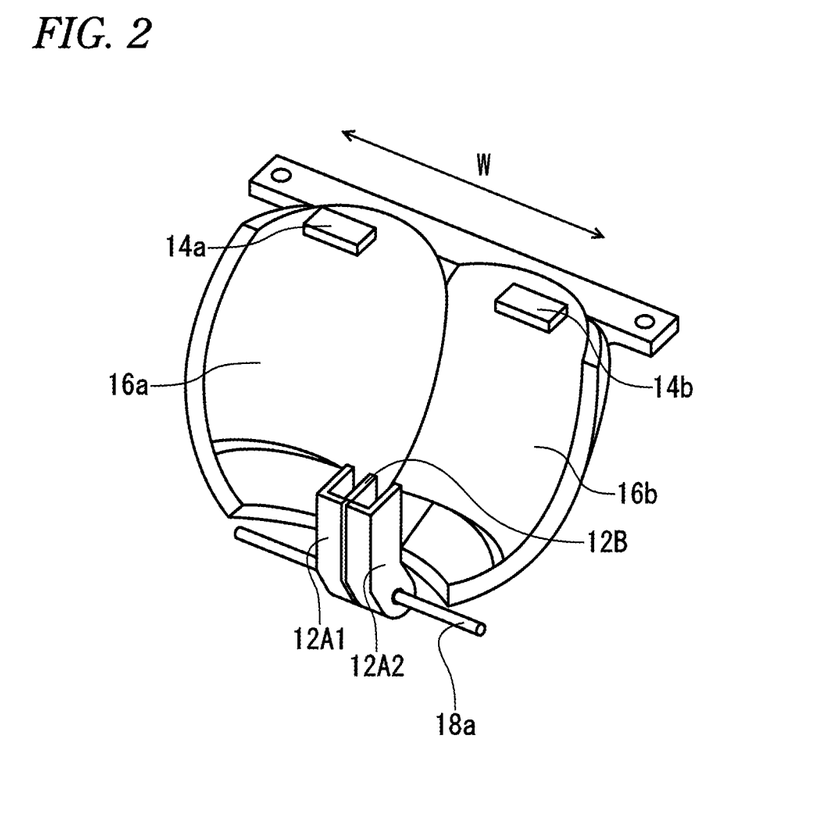
FIG. 2 is a perspective view explaining an arrangement relationship a light source, a reflector, a first shade, and a second shade of the optical unit of the present embodiment.

The optical unit 10 includes two types of shades (a first shade 12A and a second shade 12B described later), a movement mechanism 18, a bulb 14 as a light source, a lamp housing 17 which supports a reflector 16 on an inner wall, and a projection lens 20. As the bulb 14, for example, an incandescent lamp, a halogen lamp, a discharge lamp, and an LED can be used. The present embodiment describes an example in which the bulb 14 is composed of an LED array. The reflector 16 reflects light emitted from the bulb 14. Subsequently, the light reflected by the reflector 16 is guided to the projection lens 20. As shown in FIG. 2, the optical unit 10 of the present embodiment has a bulb 14a as a first light source and a bulb 14b as a second light source in a vehicle width direction W, and each of the bulbs 14a and 14b is subjected to the turning on/off control by the control section 228. In addition, dedicated reflectors 16a and 16b are disposed in correspondence to the bulbs 14a and 14b respectively, and guide the respective lights from the bulbs 14a and 14b toward respective specific directions. Further, in the case of the present embodiment, a plurality of the first shades 12A is disposed adjacent to each other in the vehicle width direction W. FIG. 2 shows an example in which there are disposed a first shade 12A1 for blocking mainly the light from the bulb 14a and a first shade 12A2 for blocking mainly the light from the bulb 14b. It is to be noted that, when it is not particularly necessary to distinguish between the first shades 12A1 and 12A2, the first shades 12A1 and 12A2 are denoted as the first shades 12A in the following description. Similarly, when it is not particularly necessary to distinguish between the bulbs 14a and 14b and between the reflectors 16a and 16b, the bulbs 14a and 14b are denoted as the bulbs 14, and the reflectors 16a and 16b are denoted as the reflectors 16.

The first shades 12A and the second shade 12B are structured to be rotated about a rotation shaft 18a so as to be movable between a position which blocks a part of the light travelling from the bulbs 14 toward the projection lens 20 (hereinbelow referred to as an advanced position) and a position which does not block the part of the light (hereinbelow referred to as a retreated position). It is to be noted that FIGS. 1 and 2 show a state where the first shades 12A and the second shade 12B are moved to the advanced position. The movement mechanism 18 includes an actuator which rotates the first shades 12A. In addition, the first shades 12A are provided with biasing members, which return the first shades 12A to a specific attitude, e.g., the retreated position when the actuator is in a non-driven state. The biasing members can be structured of, e.g., coil springs or torsion springs. By having the structure described above, the presence or absence of high-beam illumination can be controlled by the turning on/off control of the bulbs 14 even when the movement mechanism 18 fails. That is, it is possible to avoid the situation where a high-beam light distribution pattern can not be used. In addition, when the movement mechanism 18 is brought into the non-driven state due to a failure or the like, since an illumination state can be shifted to a low-beam illumination state by turning off the bulbs 14, a fail-safe function can be implemented. Though described later, it is to be noted that the second shade 12B is a shade which is driven by the movement operations of the first shades 12A, only a biasing member for returning the second shade 12B to, e.g., the retreated position is connected thereto and, an actuator for moving the second shade 12B to the advanced position is not connected thereto. Consequently, when the first shades 12A move to the advanced position, the second shade 12B also moves to the advanced position. Similarly, when the first shades 12A move to the retreated position, the second shade 12B also moves to the retreated position.

Figure 3:
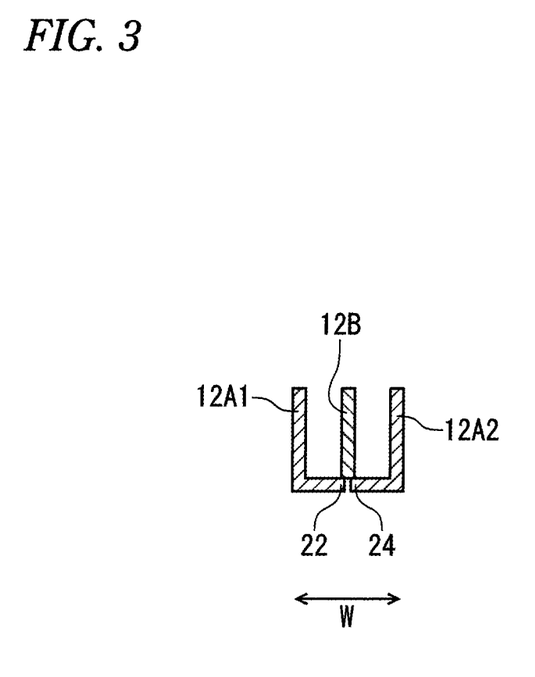
FIG. 3 is an explanatory view explaining an engaging state of the first shade and the second shade of the optical unit of the present embodiment.

In the case of the present embodiment, as shown in FIG. 3, each of the first shade 12A1 and the first shade 12A2 is a member having a substantially L-shaped cross section when viewed from above, and the shades are disposed at a specific interval in the vehicle width direction W. On the other hand, the second shade 12B is a flat plate-like member having a specific thickness in the vehicle width direction W, and is engaged with an end portion 22 in the vehicle width direction of the first shade 12A1 and an end portion 24 in the vehicle width direction of the first shade 12A2. As shown in FIG. 3, the second shade 12B is disposed so as to cover a gap between the adjacent first shades 12A1 and 12A2, and prevents the light of the bulbs 14 from leaking from the gap at the time of light blocking when both of the first shades 12A1 and 12A2 have moved to the advanced position. Thus, since the light leakage can be prevented by the second shade 12B, the first shades 12A1 and 12A2 can be structured so as not to directly come in contact with each other in the vehicle width direction W. As a result, the movement operations of the first shades 12A1 and 12A2 do not interfere with each other, and the first shades 12A1 and 12A2 can be smoothly rotated about the rotation shaft 18a without causing an abrasion resulting from the contact therebetween.

It is to be noted that, although FIG. 1 shows the example in which the aiming mechanism and the leveling mechanism are provided in the vehicle headlamp apparatus for high beam 210, the aiming mechanism and the leveling mechanism may be omitted. For example, the vehicle headlamp apparatus for high beam 210 can be integrally combined with a vehicle headlamp apparatus for low beam. In this case, the aiming mechanism and the leveling mechanism can be provided in one of the vehicle headlamp apparatus for high beam or the vehicle headlamp apparatus for low beam, or can be provided in a base member on which both of the vehicle headlamp apparatuses are placed. In addition, the structure may also be adopted in which the aiming adjustment and the leveling adjustment can be simultaneously performed in both of the vehicle headlamp apparatuses.

Figure 4:
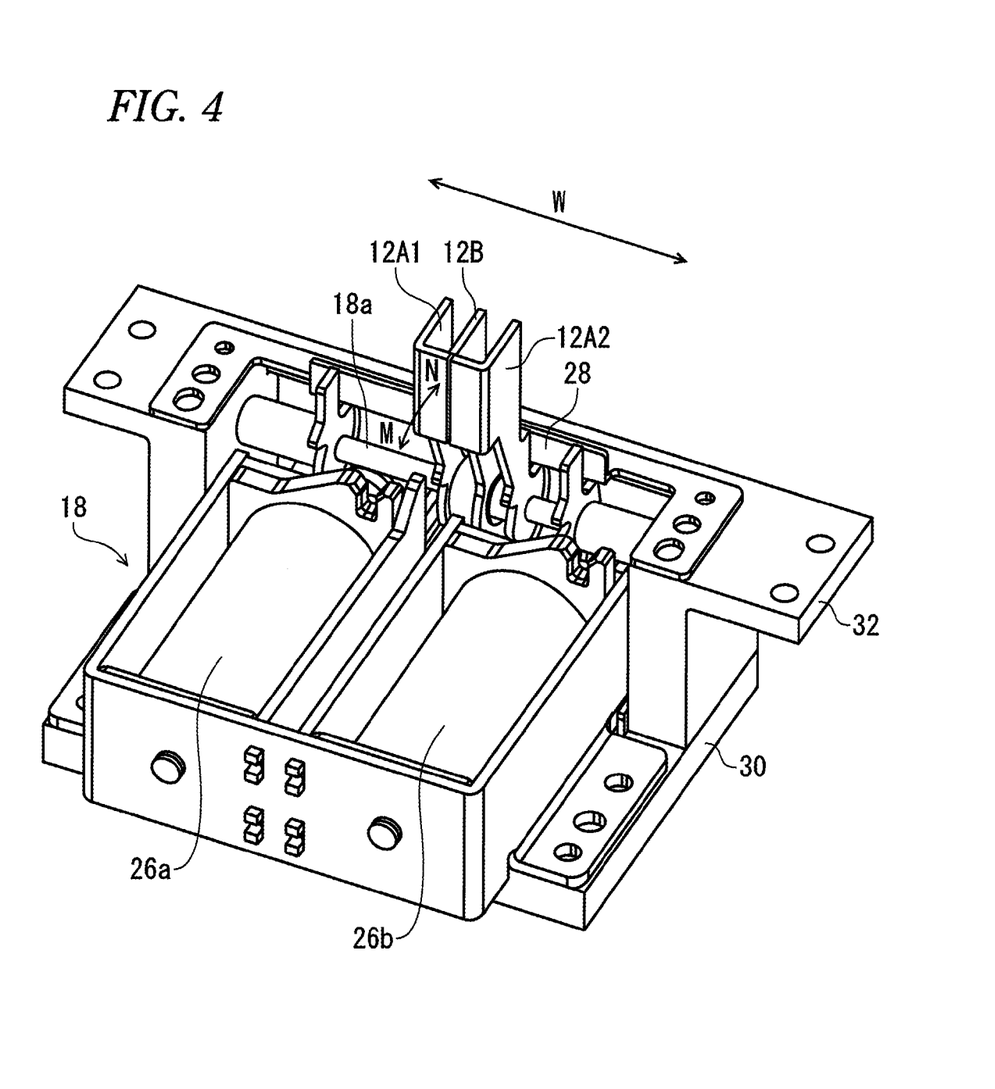
FIG. 4 is a schematic structural view explaining the first shade, the second shade, and the movement mechanism of the optical unit of the present embodiment.

FIG. 4 is a schematic structural view explaining the first shades 12A, the second shade 12B, and the movement mechanism 18 of the optical unit 10 of the present embodiment.

As described above, the optical unit 10 of the present embodiment has the first shade 12A1 and the first shade 12A2 as the first shades 12A disposed adjacent to each other in the vehicle width direction W via the specific gap. The first shades 12A1 and 12A2 are movable between the advanced position (a position reached by movement in a direction of an arrow N) and the retreated position (a position reached by movement in a direction of an arrow M) by operations of solenoids 26a and 26b included in the movement mechanism 18 independently of each other. Further, the second shade 12B is engaged with the end portion in the vehicle width direction W of at least one of the first shades 12A1 and 12A2, and moves between the advanced position and the retreated position by being driven by the first shade with which the second shade 12B is engaged. It is to be noted that FIG. 4 shows a state where each of the solenoids 26a and 26b is in a driven state, and the first shades 12A1 and 12A2 and the second shade 12B driven thereby are moved to the advanced position. That is, by driving the solenoids 26a and 26b, the optical unit 10 basically functioning as an optical unit for forming a complete high-beam light distribution pattern is adapted to form a special light distribution pattern in which a part of light is blocked.

On the side of the advanced position of the first shades 12A1 and 12A2, there is disposed a stopper 28 which comes in contact with a part of the first shade 12A1 or 12A2 to control the advanced position and stop the first shade 12A1 or 12A2 at a precise position. Consequently, the drive accuracy of the solenoids 26a and 26b is not required so that relatively inexpensive solenoids can be employed. It is to be noted that, since the second shade 12B is driven by the operation of at least one of the first shades 12A1 and 12A2, the second shade 12B is not necessarily required to come in contact with the stopper 28.

Since the first shades 12A1 and 12A2, the second shade 12B, and the solenoids 26a and 26b are supported by a solenoid base 30 and a solenoid support 32 as a unit, they are capable of being easily mounted on optical units having other structures.

Figure 5A:
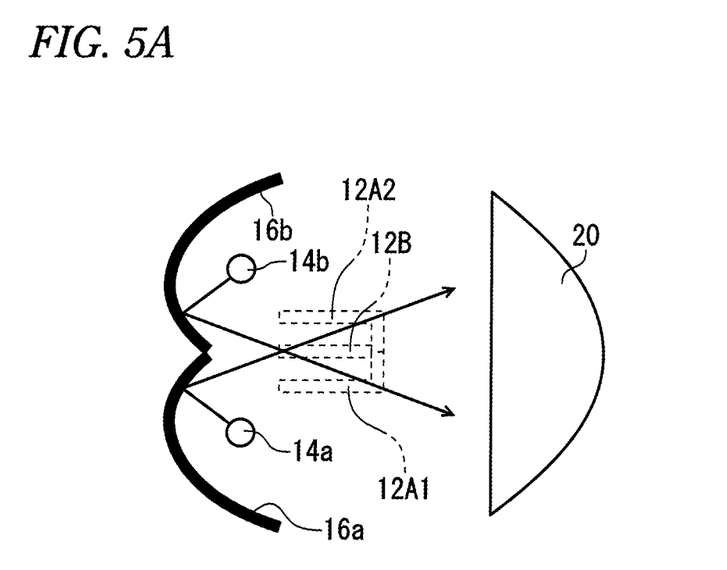
FIGS. 5A and 5B are explanatory views each explaining the light distribution pattern formed by the first and second sources of the optical unit of the present embodiment.
Figure 5B:
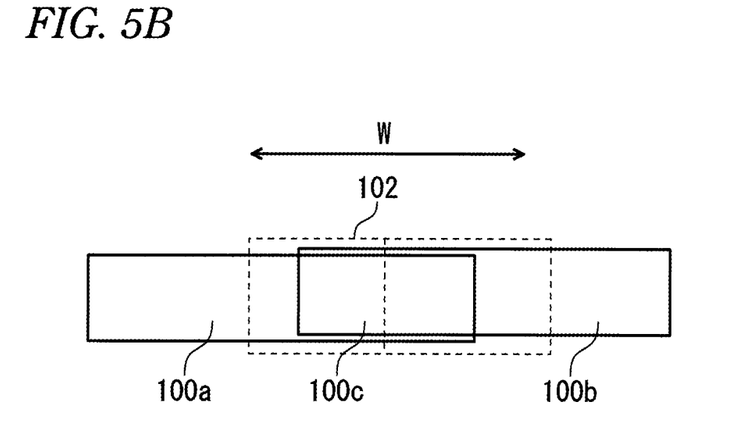

FIG. 5 includes explanatory views each explaining the light distribution pattern formed by the bulbs 14a and 14b of the optical unit of the present embodiment. As shown in FIG. 5A, the optical unit 10 of the present embodiment has the two bulbs 14. The bulb 14a emits light in the forward direction of the vehicle via the projection lens 20, and is capable of forming a slender first illuminated area 100a extending in the vehicle width direction W, as shown in FIG. 5B. In addition, the other bulb 14b similarly emits light in the forward direction of the vehicle via the projection lens 20, and is capable of forming a slender second illuminated area 100b extending in the vehicle width direction W. The shape of the light source of the bulb 14a itself is formed into a shape in correspondence to the slender light distribution pattern of FIG. 5B, or a shape in correspondence to the slender light distribution pattern is formed using reflection adjustment by the reflector 16a and is guided toward the projection lens 20. The same applies to the bulb 14b. Each of the reflectors 16a and 16b is a reflector formed with reference to, e.g., a paraboloid of revolution or the like.

In the case of the present embodiment, the second illuminated area 100b is coupled to the first illuminated area 100a in overlapping relation in a lateral direction of the first illuminated area 100a relative to an optical axis O. FIG. 5B shows an example in which an end portion area of the first illuminated area 100a and an end portion area of the second illuminated area 100b overlap each other to form an overlapped portion 100c. The adjustment of the overlapped portion 100c can be performed by, e.g., position adjustment of the individual bulbs 14a and 14b and shape adjustment of the reflectors 16a and 16b. By overlapping the first illuminated area 100a and the second illuminated area 100b in the coupled portion in this manner, when the high beam is formed, the lights are superimposed in the vicinity of the central portion so that the luminous intensity can be enhanced, and a dark portion is not formed in the coupled portion of the first and second illuminated areas 100a and 100b so that improvements in visibility and quality at the time of use of the high beam can be facilitated.

It is to be noted that the end portion areas of the first and second illuminated areas 100a and 100b are not necessarily required to be overlapped, and the end portion area of the first illuminated area 100a may be precisely coupled to the end portion area of the second illuminated area 100b without the overlapped portion. It is to be noted that, although FIG. 5B shows the first and second illuminated areas 100a and 100b which are displaced from each other in the vertical direction in order to explain that the end portion areas of the first and second illuminated areas 100a and 100b are overlapped, they are actually disposed without the vertical displacement.

When the first shades 12A1 and 12A2 and the second shade 12B have moved to the advanced position, the light to the end portion area including at least the coupled portion where the first and second illuminated areas 100a and 100b are coupled to each other is blocked. FIG. 5B shows a light-blocked area 102 blocked by the first shades 12A1 and 12A2 and the second shade 12b in a broken line. In the present embodiment, the sizes of the first shades 12A1 and 12A2 are determined such that the light-blocked area 102 is larger than the overlapped portion 100c so as to completely cover the overlapped portion 100c.

Thus, by adding the first and second illuminated areas 100a and 100b to an upper portion of a low-beam light distribution pattern which is separately turned on by turning on the bulbs 14a and 14b, a high-beam light distribution pattern with all bulbs turned on can be formed. Consequently, by moving the two first shades 12A1 and 12A2 and the second shade 12B for forming the light-blocked area 102 to the advanced position, a special light distribution pattern in which a part of the high-beam light distribution pattern is blocked can be formed without changing the turned-on state of the bulbs 14a and 14b.

Figure 6:
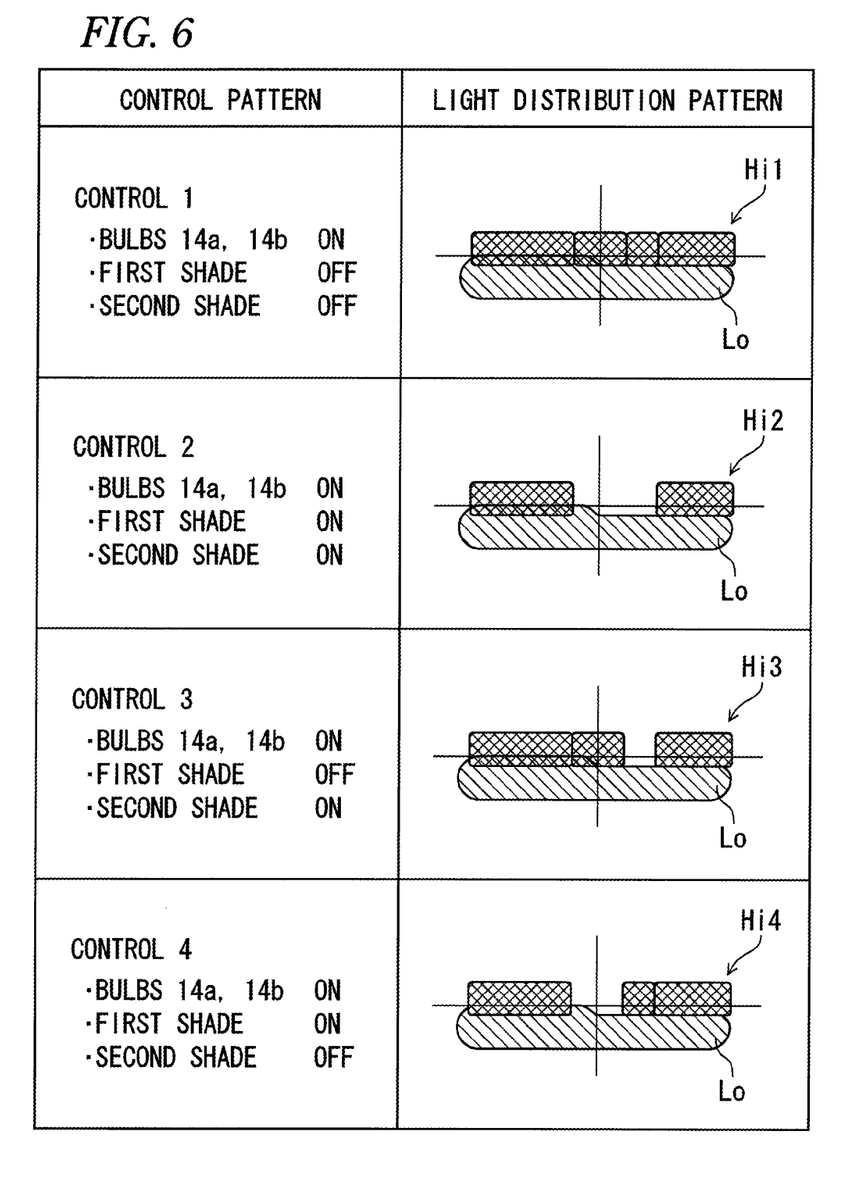
FIG. 6 is an explanatory view explaining examples of an image of the light distribution pattern which can be formed by the optical unit of the present embodiment.

FIG. 6 shows examples of a control state of the optical unit 10 and an image of the light distribution pattern to be formed. It is to be noted that the light distribution patterns shown in FIG. 6 show states thereof each in which the light distribution pattern formed by the high-beam optical unit 10 is added to an upper portion of a low-beam light distribution pattern Lo formed by a low-beam optical unit. In addition, FIG. 6 shows examples in which the first shades 12A1 and 12A2 of the optical unit 10 for forming the light distribution patterns shown in FIG. 6 are different from those of the optical unit 10 shown in each of FIGS. 2 to 4 in the width in the vehicle width direction W and the disposition position. That is, FIG. 6 shows examples each in which the first shade 12A1 having the width wider than the width in the vehicle width direction W of the first shade 12A2 is disposed with the optical axis O of the optical unit 10 as the center. Thus, the light distribution pattern can be changed also by changing the width and the disposition position of each of the first shades 12A1 and 12A2.

It is to be noted that the vehicle headlamp apparatus 210 of the present embodiment performs the turning on/off control of the bulbs 14a and 14b, and also performs control of advancement and retreat of the first shades 12A1 and 12A2 in accordance with the position or presence of a forward vehicle and a pedestrian in a forward area acquired by a forward visual recognition apparatus mounted on a vehicle side such as, e.g., a camera or the like to select the optimum light distribution pattern. In FIG. 6, a description will be given by using, as an example, the case where only movement control of the first shades 12A1 and 12A2 is performed with the bulbs 14a and 14b remaining in the turned-on state.

First, a description will be given of a control 1 for forming a complete high-beam light distribution pattern Hi 1. The control section 228 turns on the bulbs 14a and 14b, and brings the movement mechanism 18 into a non-controlled state in accordance with whether vehicles or the like are present in a forward area of a vehicle on which the vehicle headlamp apparatus is mounted to move the first shades 12A1 and 12A2 to the retreated position. That is, by bringing the vehicle headlamp apparatus into a completely non-light-blocking state, the first and second illuminated areas 100a and 100b including the overlapped portion 100c in FIG. 5B come to be illuminated. This state corresponds to a complete high-beam illumination state. Consequently, the visibility in a forward area of a driver of the vehicle can be improved. In addition, by the formation of the overlapped portion 100c, the luminous intensity in the vicinity of the center is enhanced, and the visibility is further improved.

Next, a control 2 creates a maximum light-blocking state in the turned-on state of the bulbs 14a and 14b. The control section 228 turns on the bulbs 14a and 14b, and controls the solenoids 26a and 26b of the control mechanism 18 in accordance with whether vehicles or the like are present in the forward area of a vehicle on which the vehicle headlamp apparatus is mounted to move the first shades 12A1 and 12A2 to the advanced position. By blocking light using the first shades 12A1 and 12A2, there is formed a special high-beam light distribution pattern Hi 2 in which high-beam light is not emitted to an area from the vicinity of the center ahead of the vehicle (long distance) to the vicinity of the center in the opposite lane (short distance). This light distribution pattern is a light distribution pattern which is preferably used, e.g., when a large number of oncoming vehicles are present in a long-distance area and in a short-distance area in the opposite lane, no leading vehicle is present in a short-distance area on the vehicle's lane side, and no pedestrian is present on a road shoulder of the opposite lane. In this case, it is possible to prevent the glare to a forward vehicle present in the long-distance area and the oncoming vehicle present in the short-distance area on the opposite lane side, and improve the view range of a driver of the vehicle on the vehicle's lane side and the visibility in the road shoulder on the opposite lane side.

A control 3 is a light distribution pattern which allows the prevention of the glare to the short-distance area in the opposite lane in the turned-on state of the bulbs 14a and 14b. The control section 228 turns on the bulbs 14a and 14b, and controls the solenoid 26b of the movement mechanism 18 in accordance with whether vehicles or the like are present in the forward area of a vehicle on which the vehicle headlamp apparatus is mounted to move only the first shade 12A2 to the advanced position. By blocking light using the first shade 12A2, there can be formed a special high-beam light distribution pattern Hi 3 in which the high-beam light is not emitted to the vicinity of the center in the opposite lane. This light distribution pattern is a light distribution pattern which is preferably used, e.g., when an oncoming vehicle is present in the short-distance area in the opposite lane, no leading vehicle is present in the long-distance area, and no pedestrian is present on the road shoulder of the opposite lane. In this case, it is possible to prevent the glare to the oncoming vehicle on the opposite lane side, especially in the short-distance area, and improve the view range of the driver of the vehicle on the vehicle's lane side and in the long-distance area, and the visibility in the road shoulder on the opposite lane side.

A control 4 is a light distribution pattern which is preferably used when a forward vehicle is present in the vicinity of the center ahead of a vehicle on which the vehicle headlamp apparatus is mounted, no leading vehicle is present in the short-distance area on the vehicle's lane side, and no pedestrian is present on the opposite lane side in the turned-on state of the bulbs 14a and 14b. The control section 228 turns on the bulbs 14a and 14b, and controls the solenoid 26a of the movement mechanism 18 in accordance with whether vehicles or the like are present in the forward area of the vehicle to move only the first shade 12A1 to the advanced position. By blocking light using the first shade 12A1, there can be formed a special high-beam light distribution pattern Hi 4 in which the high-beam light is not emitted to the vicinity of the center ahead of the vehicle. This light distribution pattern is a light distribution pattern which is preferably used, e.g., when a forward vehicle is present in the vicinity of the center ahead of the vehicle (long distance), no oncoming vehicle is present in the short-distance area in the opposite lane, no leading vehicle is present in the short-distance area on the vehicle's lane side, and no pedestrian is present on the opposite lane side. In this case, it is possible to prevent the glare to the forward vehicle present in the long-distance area in the vicinity of the center ahead of the vehicle, and improve the view range of the driver of the vehicle in the short-distance area on the vehicle's lane side and in the short-distance area on the opposite lane side and the visibility in the road shoulder on the opposite lane side.

Thus, by controlling the advancement and retreat of the first shades 12A1 and 12A2, it becomes possible to form the light distribution patterns which can not be realized only by the turning on/off control of the bulbs 14a and 14b. Further, besides the control of the first shades 12A1 and 12A2 in the controls 1 to 4, by adding the turning on/off control of the bulbs 14a and 14b, it is possible to form even more light distribution patterns. For example, in the control 2 explained using FIG. 6, by turning on only the bulb 14a and turning off the bulb 14b, there can be formed what is called a "left-side high light distribution pattern" in which mainly the vehicle's lane side is brought into a high-beam state. Conversely, by turning on only the bulb 14b and turning off the bulb 14a, there can be formed a light distribution pattern substantially equal to the low-beam light distribution pattern in which mainly the view range in the road shoulder of the opposite lane is illuminated using the high beam.

In addition, in the control 3 explained using FIG. 6, by turning on only the bulb 14a and turning off the bulb 14b, there can be formed an "extended left-side high light distribution pattern" which brings the vehicle's lane side and the long-distance area in the vicinity of the center into the high-beam state, and the glare to an object present on the opposite lane side is suppressed. Conversely, by turning on only the bulb 14b and turning off the bulb 14a, there can be formed an "opposite lane portion light-blocking light distribution pattern" in which the glare to the vehicle's lane side and the short-distance area in the opposite lane is suppressed.

In the control 4 explained using FIG. 6, also by turning on only the bulb 14a and turning off the bulb 14b, the "left-side high light distribution pattern" can be formed. Conversely, by turning on only the bulb 14b and turning off the bulb 14a, there can be formed what is called a "right-side high light distribution pattern" which brings mainly the opposite lane side into the high-beam state.

Thus, it is possible to easily form even more light distribution patterns by the combination of the control of the first shades 12A1 and 12A2 and the control of the bulbs 14a and 14b.

Figure 7A:
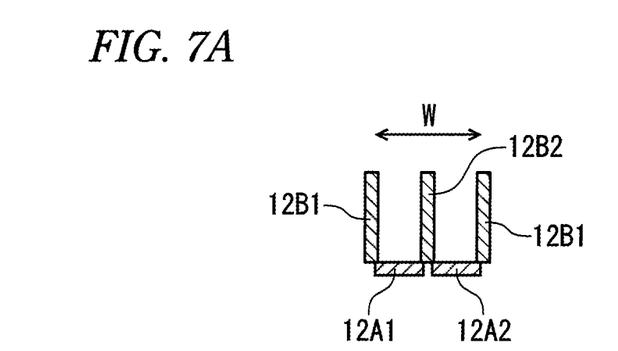
FIGS. 7A to 7C are explanatory views each explaining a modified example of the first shade and the second shade of the optical unit of the present embodiment.

FIG. 8 shows a modified example of the first shade 12A and the second shade 12B. In the above-described embodiment, the description has been given of the example in which the member having the substantially L-shaped cross section when viewed from above as shown in FIG. 3 is employed. FIG. 7A shows the flat plate-like first shades 12A1 and 12A2 extending in the vehicle width direction W which are disposed adjacent to each other in the vehicle width direction W via a specific gap, and are movable between the advanced position which blocks a part of light emitted from the bulb and the retreated position which does not block the light. The second shade 12B is engaged with the end portions in the vehicle width direction W of the first shades 12A, driven by the first shades 12A to move between the advanced position and the retreated position, and covers the gap between the adjacent first shades 12A. Similar to the structure shown in FIG. 4, the first shades 12A1 and 12A2 move between the advanced position and the retreated position using the solenoids 26a and 26b of the movement mechanism 18 independently of each other. Consequently, when the first shade 12A1 moves to the advanced position, the second shades 12B1 and 12B2 engaged with the first shade 12A1 are driven thereby. In addition, when the first shade 12A2 moves to the advanced position, the second shades 12B2 and 12B1 engaged with the first shade 12A2 are driven thereby. Further, when the first shades 12A1 and 12A2 move to the advanced position, the second shades 12B1, 12B2, and 12B1 are driven thereby. That is, by moving the first shades 12A1 and 12A2, the same state as the state explained using FIG. 3 can be created. In this case, the number of second shades 12B to be formed is larger than the number of first shades 12A to be formed by one, and both end portions in the vehicle width direction of the first shade 12A are engageable. As a result, even when a plurality of the first shades 12A is successively disposed adjacent to each other, the second shades 12B each having the function of preventing light leakage can be reliably driven. In addition, since the first and second shades 12A and 12B can be structured as a simple plate-like member, the simplification of the optical unit 10 can be facilitated. On the other hand, as shown in FIG. 3, when the L-shaped shade obtained by integrally forming the first shade 12A1 and the second shade 12B1 is used, the advantage is achieved that the number of parts can be reduced.

Figure 7B:
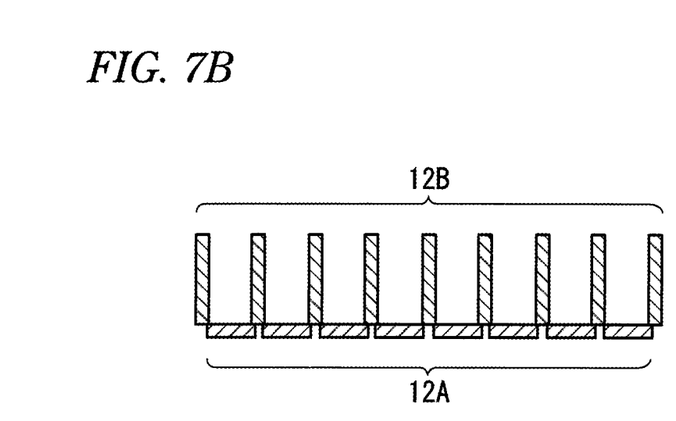

It is to be noted that, as shown in FIG. 7B, by successively positioning the structure of FIG. 7A, the illuminated area of the high-beam light distribution pattern to be formed can be easily subdivided. As a result, it is possible to easily increase the number of types of the light distribution patterns. Thus, even when the illuminated area is subdivided, it is possible to achieve simplification by forming the shape of each of the first shade 12A and the second shade 12B into the flat plate-like shape, and easily standardize the parts. In addition, the number of subdivided areas can be easily increased or decreased.

Figure 7C:
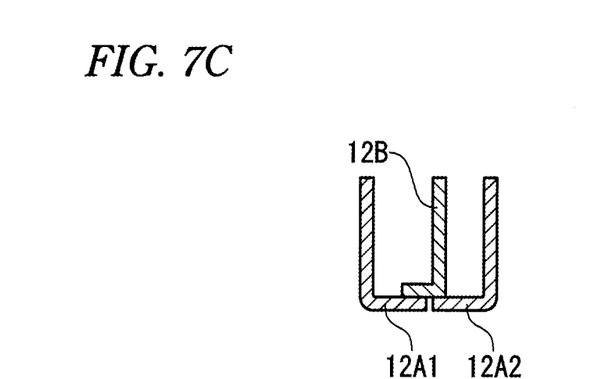

FIG. 7C shows a modified example of the L-shaped first shades 12A1 and 12A2 shown in FIG. 3, and the second shade 12B is also formed into the L shape. In this case, the light-blocked area can be formed also by the second shade 12B. That is, it becomes possible to change the light-blocked area, and further increase the number of types of the light distribution patterns.

Figure 8A:
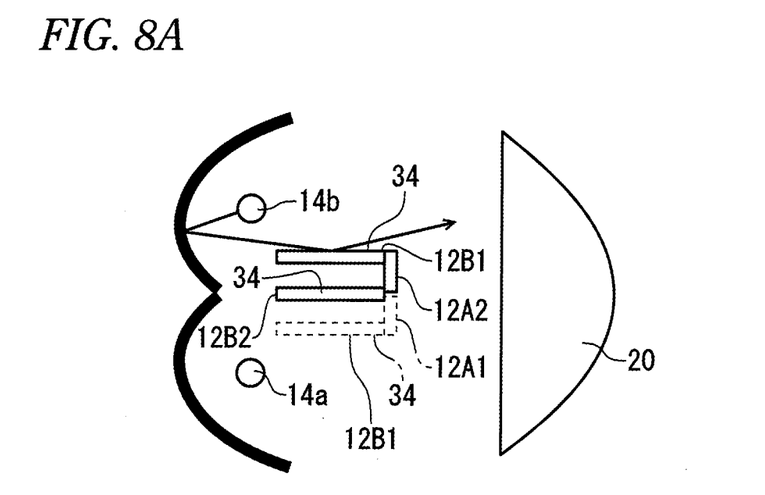
FIGS. 8A to 8C are explanatory views each explaining a reflective effect by a reflective surface formed by the shade of the optical unit of the present embodiment.
Figure 8B:
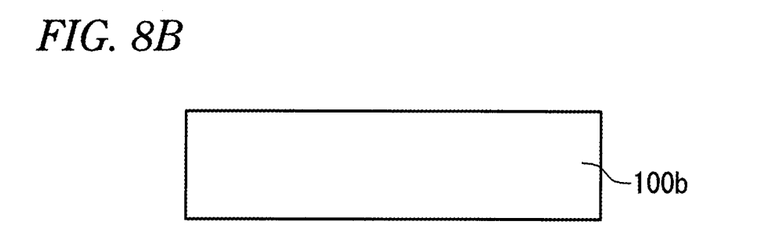
Figure 8C:
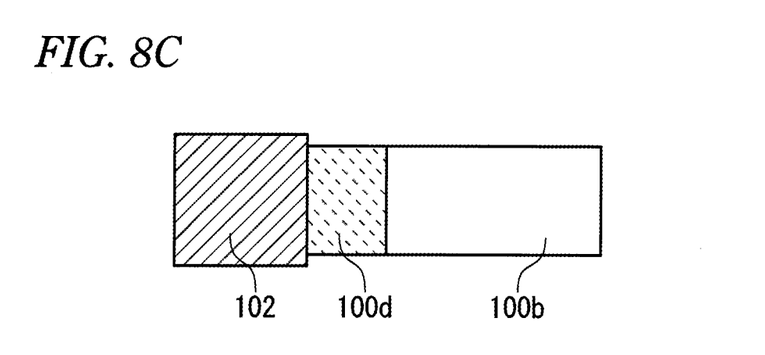

FIGS. 8A to 8C are explanatory views each explaining a state of reflection and a state of superimposition of reflected lights in the case where an extended portion 34 of the second shade 12B extending in the direction of the optical axis O has a reflective surface. The extended portion 34 of the second shade 12B2 disposed between the adjacent first shades 12A is formed with reflective surfaces on both surfaces thereof such that light from the light source is reflected and guided forward. In addition, when the second shade 12B2 is disposed at the end portion on the non-adjacent side of the first shade 12A1 or the first shade 12A2 as the second shade 12B1, the extended portion 34 of the second shade 12B2 is formed with the reflective surface only on one of the surfaces which serves as the outside surface. The reflective surface can be formed by, e.g., joining or coating of a reflective member. Since light from the bulbs 14 does not reach the inside surface of the second shade 12B1, the reflective surface is not necessary, and therefore the reflective surface is not formed on this surface, whereby the reduction in the cost of the parts can be facilitated.

The surface state of the reflective surface is formed such that the light incident on the reflective surface on the side of the bulb 14a is guided to a specific position in the first illuminated area 100a of FIG. 3. Similarly, the surface state of the reflective surface is formed such that the light incident on the reflective surface on the side of the bulb 14b is guided to a specific position in the second illuminated area 100b.

FIG. 8B shows the second illuminated area 100b formed when only the bulb 14b is turned on and the first shades 12A1 and 12A2 are moved to the retreated position (non-light-blocking state). FIG. 8C shows the second illuminated area 100b and the light-blocked area 102 formed when only the bulb 14b is turned on and the first shade 12A2 is moved to the light-blocking position. In this case, the reflected light reflected by the second shade 12B1 is superimposed on a position on the side of the light-blocked area 102 of the second illuminated area 100b, and a superimposed portion 100d is thereby formed. As in each of the controls 2 to 4 shown in FIG. 6, when a part of the high-beam light distribution pattern is blocked, a driver tends to feel anxious about the light-blocked portion. However, by increasing the luminous intensity in an area lateral to the light-blocked area using the superimposed portion 100d, it becomes easier to give a sense of safety to the driver. Similarly, when the bulb 14a is turned on, the reflected light can also be superimposed on a specific position in the first illuminated area 100a, and the similar effect can be obtained. That is, when the bulbs 14a and 14b are turned on, the luminous intensities on both sides of the light-blocked area can be enhanced. As a result, even when the light-blocked area for preventing the glare is formed, by brightening the surrounding area thereof, it is possible to give a sense of safety to the driver. It is to be noted that, in another embodiment, the angle or the position of the reflective surface may be adjustable. In this case, it becomes possible to change the position of the superimposed portion by the reflected light, and enhance the luminous intensity of the area in correspondence to the preference of the driver, and enhance a utility value of the reflected light.

It is to be noted that, in the above-described embodiment, the description has been given of the examples in which the first shades 12A and the second shades 12B are formed into the flat plate-like shape or the shape having the L-shaped cross section. However, if the second shades 12B, which are driven by the first shades 12A can be provided so as to cover the gap between the first shades 12A, which are disposed adjacent to each other, even when the shapes thereof are appropriately changed, it is possible to provide the optical unit, which smoothly operates without the abrasion of the individual first shades 12A resulting from the direct contact thereof, while also preventing the light leakage from between the adjacent first shades 12A.

In addition, in the present embodiment, the description has been given of the example in which the movement mechanism 18 is embodied by the solenoids. However, the drive system can be appropriately selected, and the similar effect can be obtained by using, e.g., a motor or a cam mechanism.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical unit used in a vehicle lighting device, comprising:
    a plurality of first shades which are disposed adjacent to each other in a vehicle width direction and separated by a specific gap, wherein at least one of the plurality of first shades is movable between an advanced position which blocks a part of light emitted from a light source and a retreated position which does not block the light;
    a second shade, which is engaged at least one end portion in the vehicle width direction of the at least one of the plurality of the first shades, and driven by the at least one of the plurality of first shades to move between the advanced position and the retreated position, and covers the gap between the adjacent first shades; and a movement mechanism which is connected to the at least one of the plurality of the first shades and moves the first shade to one of the advanced position and the retreated position.

2. The optical unit of claim 1, wherein a number of the second shades to be formed is larger by one than a number of the plurality of the first shades to be formed, and both of the end portions in the vehicle width direction of the at least one of the plurality of first shades are engaged by one of the second shades.

3. The optical unit of claim 2, wherein at least one of the second shades has an extended portion extending in an optical axis direction, the extended portion of the second shade being disposed between the adjacent first shades and is formed with reflective surfaces to reflect the light from the light source to guide the reflected light forward of both reflective surfaces thereof, wherein the extended portion of the second shade is disposed at the end portion on a non-adjacent side of the first shade and is formed with one of the reflective surfaces on an outside surface of the extended portion.

4. The optical unit of claim 2, wherein the second shade is disposed at the end portion on the non-adjacent side of the first shade and is integrally formed with the first shade, and has an L-shaped horizontal cross section.

5. The optical unit of claim 1, wherein the movement mechanism moves the first shade to the retreated position when the movement mechanism is in a non-driven state.

6. The optical unit of claim 1, further comprising:
a first light source which emits light mainly to a driving lane side; and
a second light source which emits light mainly to an opposite lane side.

* * * * *